(No Model.)
A. O. MUHLSTEIN.
APPARATUS FOR ELEVATING HOSE.
No. 485,129. Patented Oct. 25, 1892.
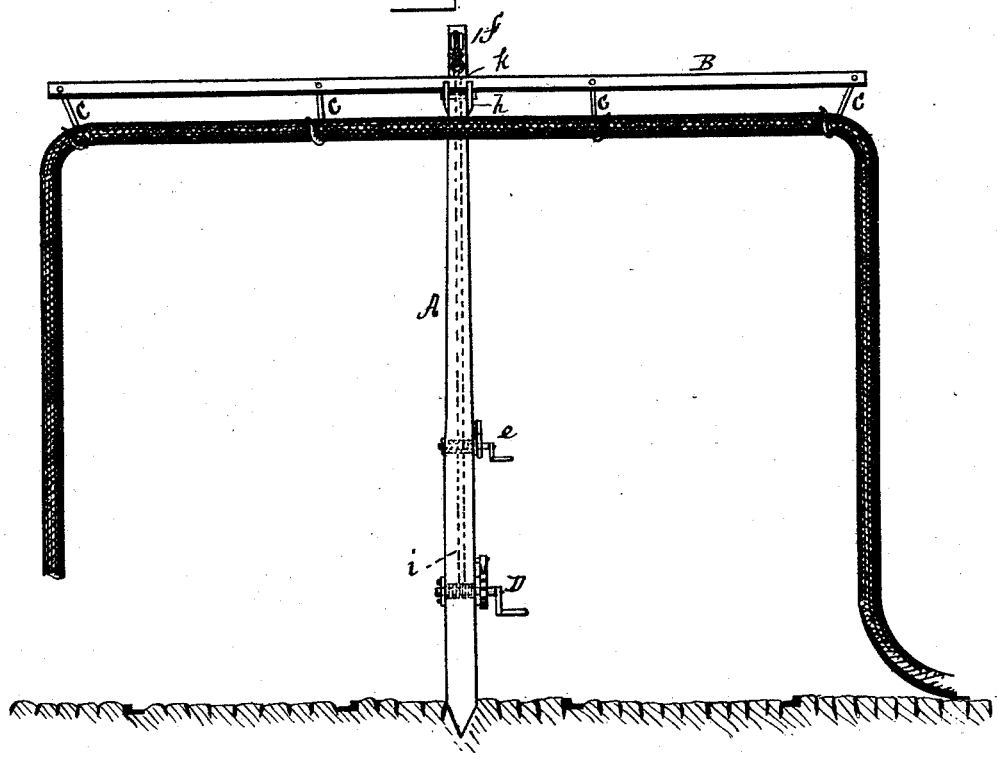
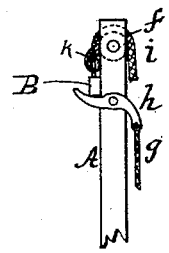
WITNESSES:
INVENTOR
Adolph O. Muhlstein
BY A. C. Johnston
ATTORNEY.

UNITED STATES PATENT OFFICE.

ADOLPH O. MUHLSTEIN, OF PITTSBURG, PENNSYLVANIA, ASSIGNOR TO THE MUEHLSTEIN MANUFACTURING COMPANY, OF SAME PLACE.

APPARATUS FOR ELEVATING HOSE.

SPECIFICATION forming part of Letters Patent No. 485,129, dated October 25, 1892.

Application filed December 15, 1891. Serial No. 415,147. (No model.)

*To all whom it may concern:*

Be it known that I, ADOLPH O. MUHLSTEIN, of Pittsburg, in the county of Allegheny and State of Pennsylvania, have invented a new and useful Improvement in Apparatus for Elevating Hose; and I do hereby declare the following to be a full, clear, and exact description thereof.

My invention relates to an improvement in apparatus for elevating and suspending hose above a railway-track to admit the passage of cars and vehicles thereunder; and it consists in the combination and arrangement of parts, hereinafter described, and shown in the accompanying drawings.

To enable others skilled in the art with which my invention is most nearly connected to make and use it, I will proceed to describe its construction and operation.

In the accompanying drawings, which form part of my specification, Figure 1 is a front elevation of my improvement. Fig. 2 is a detailed view showing the arrangement for holding the hose when raised up to the top of the supporting-post.

In the drawings, A represents an upright support, at or near the upper end of which is a pulley $f$. At a suitable distance from the lower end of the support A is a ratchet-pulley D. A rope or chain $i$ is connected to the ratchet-pulley D and passes through the pulley $f$. To the end of the rope $i$ is a hook $k$, which hooks into an eyebolt in the cross-arm B, to which are loosely pivoted hooks C. Above the ratchet-pulley D is another ratchet-pulley $e$, around which is wound a cord or rope $g$, connected to a loosely-pivoted hook $h$. The upper support A is so constructed at its lower end as that it can be driven into the earth.

The operation is as follows: The support A being firmly secured in the earth, the hose to be elevated is placed in the hooks C, and the cross-arm B, being hooked to the rope $i$, the operator turns the ratchet-wheel D and hoists the cross-arm B, carrying the hose to the height desired. When that point is reached, he loosens the ratchet-wheel $e$, which will allow the hook $h$, attached to the end of the rope $g$, to fall outward under the cross-arm and hose, allowing the hose to rest therein, thereby relieving the strain from the hooks and cross-arm.

It will be readily seen that by the use of my invention in case of fires where the hose is stretched across the street it can be readily and easily elevated, allowing vehicles to pass under and thus preventing the stoppage of traffic and the crowding of the streets.

Having thus described my improvement, what I claim is—

A post or supporting-frame provided with upwardly-adjustable cross arm or arms, a pulley and cord for raising and lowering said adjustable cross arm or arms, and a series of loosely-pivoted rings or hooks attached to said cross arm or arms for supporting sections of hose over and above a railway-track.

In testimony whereof I have hereunto set my hand this 30th day of September, A. D. 1891.

ADOLPH O. MUHLSTEIN.

Witnesses:
A. C. JOHNSTON,
C. S. JOHNSTON.